2,835,712

PROCESS FOR THE PRODUCTION OF CALCIUM COMPOUNDS OF CYCLOPENTADIENE AND ITS ALKYLATED, ARALKYLATED, AND ARYLATED DERIVATIVES

Karl Ziegler and Klaus Hafner, Mulheim an der Ruhr, Germany; said Hafner assignor to said Ziegler No Drawing. Application July 11, 1955
Serial No. 521,423

10 Claims. (Cl. 260—665)

Several metal substitution products of cyclopentadiene have become known. For example, Thiele (Ber. deutsche chemische Gesellschaft, vol. 34, page 68 (1901)) has described cyclopentadiene potassium and Grignard and Courtot (Compt. rend. hebd., volume 158, page 1763 (1914)) have described a halogen magnesium compound. Recently, also sodium cyclopentadiene has been prepared (see German Patents 924,029 and 927,873). For the production of all of these metal substitution products, the corresponding metal as such is either directly or indirectly reacted with cyclopentadiene.

The metals proper, as compared with the metal compounds such as alkali hydroxide or magnesia, have a relatively high value. Therefore, the metal compounds of cyclopentadiene would be capable of being produced in a very cheap manner if it would be possible to avoid the use of the metals proper and to use instead cheaper metal compounds for the introduction of the metal into the cyclopentadiene. All of the efforts aiming at this end fail on account of the fact that cyclopentadiene is not sufficiently "acid." Therefore, a formation of salt with, for example, sodium hydroxide in the sense of an ordinary neutralization is not possible.

It has now been found that cyclopentadiene can be reacted with calcium carbide, in which reaction acetylene is set free and a calcium compound of cyclopentadiene is formed. The advantage of a process of this kind, as compared with the conversion of cyclopentadiene into, for example, its sodium compound with metallic sodium, resides in the fact that many chemical processes are available which require acetylene as the starting material and in which acetylene is hitherto produced by the known decomposition of calcium carbide with water. If, in any process of this kind, cyclopentadiene is substituted for the water required for the production of acetylene, there results the calcium cyclopentadiene which, as contrasted with calcium hydroxide, is a valuable by-product.

It is also possible, moreover, to easily convert calcium cyclopentadiene by means of carbon dioxide into dicyclopentadiene dicarboxylic acid for which a satisfactory method of production was not available so far.

The reaction between cyclopentadiene and calcium carbide will not be successful by only contacting the two materials. A reaction accelerator of a very specific type must rather be present, a reaction between calcium carbide and cyclopentadiene occurring not at all without the same. A suitable accelerator is anhydrous and especially liquid ammonia. A similar effect, however, is also exhibited by amines, especially such amines which, in proportion to the number of carbon atoms, contain as many free amino groups as possible such as methylamine, ethylene diamine, diethylene triamine, dipropylene triamine, diamino dipropyl ether.

The calcium carbide is expediently used in as fine as possible a distribution such as in the form of a very fine suspension as it may be prepared by wet grinding in an inert organic solvent. The most convenient solvent used is liquid ammonia in a relatively large amount. However, any other inert solvent or suspending agent may be used when adding to the same a certain relatively small amount of liquid ammonia and thoroughly mixing the whole. Thereafter, acetylene continuously splits off and after several hours the reaction is terminated and the conversion of cyclopentadiene into its calcium compound is complete. Similar conditions exist when using amines as reaction accelerators.

Calcium cyclopentadiene and ammonia form a very stable ammoniacate having the composition

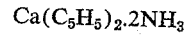

$$Ca(C_5H_5)_2 \cdot 2NH_3$$

Thus, the minimum quantity of ammonia required for a complete conversion is the quantity required for the formation of this ammoniacate. It is always expedient, therefore, to use a little more of ammonia than is combined in the ammoniacate. For example, a ratio of 51 gms. of ammonia : 64 gms. of calcium carbide : 198 gms. of cyclopentadiene : 950 gms. of decahydronaphthalene as the solvent has empirically been found to be expedient.

For many conversions of cyclopentadiene calcium, especially for the conversion into cyclopentadiene carboxylic acids or cyclopentadiene dicarboxylic acids, the ammonia content of the ammoniacate is disturbing. It is now possible to very easily obtain pure calcium cyclopentadiene from the ammoniacate by extended heating under vacuum or still better by boiling in a high boiling suspending agent such as decahydronaphthalene.

Cyclopentadiene calcium is a faintly yellowish powder which glows in the air. The calcium content is generally slightly in excess of the theoretical value of 23.5% since the commercial calcium carbide used in most cases, in addition to $CaC_2$, contains always about 10% of calcium oxide which cannot be separated from calcium cyclopentadiene.

The same behavior as that of cyclopentadiene is shown by cyclopentadienes substituted by hydrocarbon radicals, especially the alkyl, aryl and aralkyl cyclopentadienes.

It is also possible to start with dicyclopentadiene and to react the same with calcium carbide at elevated temperature and expediently in the presence of a higher boiling amine serving as a solvent. The depolymerization of dicyclopentadiene and the conversion of the monomer into the calcium compound then take place in one operation.

The products prepared in accordance with the invention do not melt and they decompose only at temperatures of more than 300° C.

Example 1

(a) 64 grams (1 mole) of finely ground calcium carbide are suspended in 1000 cc. of liquid ammonia at 40° C. with the exclusion of air. Into this suspension which is of faintly bluish color 198 grams (3 moles) of monomeric cyclopentadiene are added dropwise. This mixture is stirred for 24 hours. During this time, only little acetylene escapes, the bulk remaining dissolved in the ammonia. After the termination of the reaction the acetylene-containing ammonia is evaporated by slowly heating and passed through dilute acid. The acetylene formed (about 22 liters) may then be collected in a gas holder. After evaporation of the ammonia there is obtained a finely crystalline powder of faintly reddish color which is then heated under vacuum to 160° C. until constancy of weight is obtained. After about 8 hours the ammonia which is at first present in the combined state is removed. There remain 170 gms. of calcium cyclopentadiene in the form of a colorless and sometimes faintly yellowish powder which, in the air, immediately glows to form a black mass.

Calcium cyclopentadiene: Ca determination: Weighed in: 62.6 mg., consumption decinormal HCl: 7.8 cc. $C_{10}H_{10}Ca$ (170): Calculated, Ca 23.53%, found 24.92%.

(b) To a suspension of 64 gms. (1 mole) of finely ground calcium carbide in 950 gms. of decahydronaphthalene contained in a pressure-resistant steel vessel of 2 liters capacity equipped with a magnetically driven stirrer there are added 198 grams (3 moles) of cyclopentadiene and then 50 gms. of liquid ammonia are injected. The mixture is stirred for about 24 hours at room temperature. The pressure increases to about 12 kg./sq. cm. The acetylene is blown off through a pressure-resistant reflux condenser. It entrains only little ammonia which is combined by means of dilute acid. Following this, the ammonia is driven off by heating the pressure vessel. It can be collected in a second pressure vessel at a lower temperature. The content of the pressure vessel, while stirring, is boiled for about 2 hours with the use of the column until ammonia does no longer escape. Thereby, the cyclopentadiene used in excess distils off and can be recovered. The suspended dicyclopentadiene calcium prepared in this manner can easily be converted into dicyclopentadiene-dicarboxylic calcium by introducing carbon dioxide under pressure.

(c) 198 grams (3 moles) of cyclopentadiene are slowly added dropwise at 80° C. to a suspension of 64 gms. (1 mole) of calcium carbide in 900 cc. decahydronaphthalene and 100 cc. diethylene triamine while vigorously stirring, and about 20–24 liters of acetylene are collected in a gas holder in the course of 3–5 hours. The reaction product can then be separated from the suspending agent by filtration or centrifuging under nitrogen and dried under vacuum. The mixture of diethylene triamine and decahydronaphthalene thereby separated consists of two layers. It can be used again for the production of cyclopentadiene calcium.

(d) Dicyclopentadiene in amount of 198 gms. (1.5 moles) is added to a suspension of 64 gms. (1 mole) of calcium carbide and 500 cc. ethylene diamine which had been finely ground in a ball mill and is contained in a pressure vessel of steel of 2 liters capacity equipped with a magnetically driven stirrer. At a temperature of 165° C. in the pressure vessel the pressure is about 3 kg./sq. cm. and increases during the experiment to about 6–7 kg./sq. cm. due to the evolution of acetylene. The acetylene, during the experiment, can continuously be removed through a pressure-resistant reflux condenser and collected in the gas holder. The evolution of acetylene is terminated after 12 hours. To the suspension of cyclopentadiene calcium in ethylene diamine there are added 500 cc. of decahydronaphthalene. This mixture, while stirring, is boiled for 4 hours with the use of a column thereby quantitatively distilling off the ethylene diamine. The suspension of cyclopentadiene calcium in decahydronaphthalene thus prepared may be converted into dicyclopentadiene-carboxylic calcium by means of carbon dioxide.

Example 2

64 grams (1 mole) of finely ground calcium carbide are suspended in 1000 cc. of liquid ammonia at −40° C. with the exclusion of air. Into this suspension which is of faintly bluish color there are slowly dropped 324 gms. (3 moles) of monomeric isopropyl cyclopentadiene. The mixture is stirred for 24 hours. During this time only little acetylene escapes, the bulk remaining dissolved in the ammonia. After the termination of the reaction the acetylene-containing ammonia is evaporated by slowly heating and passed through dilute acid. The acetylene formed (about 22 liters) is collected in a gas holder. After evaporation of the ammonia there is obtained a finely crystalline powder of faintly reddish color which is heated to 160° C. under vacuum until constancy of weight is obtained. After about 8 hours the ammonia which is at first in the combined state is removed. There remain 254 gms. of calcium isopropyl cyclopentadiene in the form of a faintly brownish powder which glows in the air.

Calcium isopropyl cyclopentadiene: Ca determination: Weighed in: 84.5 mg., consumption decinormal Hcl: 7.15 cc. $C_{16}H_{22}Ca$ (254): Calculated: Ca 15.75%, found 16.92%.

Example 3

To a suspension of 64 grams (1 mole) of calcium carbide in 950 gms. decahydronaphthalene contained in a pressure vessel of steel having a capacity of 2 liters and equipped with a magnetically driven stirrer there are added 468 grams (3 moles) of benzyl cyclopentadiene and 50 gms. of liquid ammonia are injected. The mixture is then stirred for 24 hours at room temperature. The pressure increases to about 12 kg./sq. cm. The acetylene is blown off through a pressure-resistant reflux condenser. It entrains only little ammonia which is combined by dilute acid. Following this, the ammonia is driven off by heating the pressure vessel and while stirring so that the decahydronaphthalene suspension boils under reflux. The ammonia may be condensed in a second pressure vessel at a correspondingly lower temperature. If ammonia escapes no longer the suspended benzyl cyclopentadiene calcium may be converted into dibenzyl cyclopentadiene-carboxylic calcium as, for example, by introducing carbon dioxide under pressure.

Example 4

To 32 gms. (0.5 mole) of finely ground calcium carbide and 327 gms. (1.5 moles) of diphenyl cyclopentadiene there are added 500 cc. of ethylene diamine. This mixture is stirred for about 24 hours at 50–60° C. The acetylene forming in the reaction is collected in a gas holder (about 11 liters). After the termination of the reaction the suspension is diluted with 500 cc. of decahydronaphthalene and boiled with the use of a column while stirring. Thereby, the ethylene diamine distils off quantitatively. The suspension of calcium diphenyl cyclopentadiene in decahydronaphthalene thus obtained can easily be further processed with carbon dioxide to produce diphenyl cyclopentadiene-carboxylic calcium.

We claim:

1. Process for the production of calcium compounds of cyclopentadiene and its alkylated, aralkylated and arylated derivatives, which comprises reacting a compound selected from the group consisting of cyclopentadiene, dicyclopentadiene and its alkyl, aralkyl, and aryl derivatives with calcium carbide at elevated temperatures in the presence of a compound selected from the group consisting of anhydrous ammonia and anhydrous materials having a strong basic reaction and containing anhydrous $NH_2$ groups.

2. Process according to claim 1 in which the reaction is effected in the presence of inert solvents.

3. Process according to claim 1 in which temperatures up to 160° C. are used.

4. Process according to claim 1 in which a suspension of calcium carbide is used.

5. Process according to claim 1 in which ammonia is used in amount exceeding that required for the formation of an ammonium compound of calcium cyclopentadiene of the formula $Ca(C_5H_5)_2 \cdot 2NH_3$.

6. Process according to claim 4 in which the suspension of finely divided calcium carbide in an inert organic solvent used for the reaction has been prepared by wet grinding in this solvent.

7. Process according to claim 1 in which ammonia is used and said reaction mixture is heated in an inert solvent with reflux until the ammonia at first present in the combined state has completely escaped.

8. Process according to claim 1 in which ammonia is used and the reaction mixture is heated under vacuum in an inert solvent until the ammonia at first present in the combined state has completely escaped.

9. Process according to claim 1 in which the reaction is carried out in the presence of an $NH_2$ group containing compound selected from the group consisting of methyl amine, ethylene diamine, diethylene triamine, dipropylene triamine and diamino dipropyl ether.

10. Process for the production of calcium compounds of cyclopentadiene and its alkylated, aralkylated and arylated derivatives, which comprises reacting a compound selected from the group consisting of cyclopentadiene, dicyclopentadiene and its alkyl, aralkyl and aryl derivatives with a suspension of calcium carbide in decahydronaphthalene at elevated temperatures in the presence of a compound selected from the group consisting of anhydrous ammonia and anhydrous materials having a strong basic reaction and containing $NH_2$ groups.

References Cited in the file of this patent

UNITED STATES PATENTS

| | | |
|---|---|---|
| 2,563,074 | Schmerling | Aug. 7, 1951 |
| 2,754,338 | Pines | July 10, 1956 |

FOREIGN PATENTS

| | | |
|---|---|---|
| 927,873 | Germany | May 20, 1955 |

OTHER REFERENCES

Vaughn et al.: Journal of Organic Chemistry, vol. 2, No. 1, March 1937, pages 1–21.

Gilman et al.: Journal of the American Chemical Society, vol. 65, pages 267, 270, February 1943.

Jones et al.: Chemical Reviews, vol. 54, No. 5, October 1954, p. 876.